United States Patent [19]
Mori et al.

[11] Patent Number: 5,343,484
[45] Date of Patent: Aug. 30, 1994

[54] SHG (SECOND-HARMONIC GENERATION) DEVICE

[75] Inventors: Kazushi Mori, Hirakata; Mitsuaki Matsumoto, Higashiosaka; Tadao Toda, Soraku; Hideyuki Nonaka, Tsuzuki; Takao Yamaguchi, Ibaraki, all of Japan

[73] Assignee: Sanyo Electric Co., Ltd., Moriguchi, Japan

[21] Appl. No.: 930,190

[22] Filed: Aug. 12, 1992

[30] Foreign Application Priority Data

Aug. 20, 1991 [JP] Japan .................. 3-234123

[51] Int. Cl.$^5$ .................. G02F 1/37; H01S 3/109
[52] U.S. Cl. .................. 372/22; 359/328; 359/332; 385/122
[58] Field of Search .......... 385/122; 359/326–332; 372/21, 22

[56] References Cited

U.S. PATENT DOCUMENTS

| | | | |
|---|---|---|---|
| 4,763,019 | 8/1988 | Duguay et al. | 359/328 |
| 4,952,013 | 8/1990 | Harada et al. | 359/328 |
| 5,158,823 | 10/1992 | Enomoto et al. | 359/328 X |
| 5,175,784 | 12/1992 | Enomoto et al. | 385/122 |
| 5,199,097 | 3/1993 | Shinokura et al. | 385/122 |

OTHER PUBLICATIONS

IBM Technical Disclosure Bulletin, vol. 24, No. 3, Aug. 1981, p. 1472, Jain, "Use of Potassium Niobate ...".
Thin Solid Films, 136(1986), pp. 29–36, Electronics and Optics, "Non–Linear Optical Wavelengths Conversion in Ti:LiNbO$_3$ Waveguides".
Applied Physics Letters, vol. 29, No. 9, Nov. 1976, pp. 572–574, "Efficient Second-Harmonic Generator in Three-Dimensional Ti:LiNbO$_3$ Optical Waveguide".
Journal of the Optical Society of America, B, vol. 5, No. 2, Feb. 1988, pp. 267–277, "Efficient Second-Harmonic Generation in Ti:LiNbO$_3$ Channel Waveguide Resonators".
Journal of Optical Society of America B vol. 5, No 2, Feb. 1988, pp. 292–299, "Frequency Doubling in TiMgO:LiNbO$_3$ Channel Waveguides".

Primary Examiner—John D. Lee
Attorney, Agent, or Firm—Herbert F. Ruschmann

[57] ABSTRACT

An SHG device wherein a channel is formed on a part of a waveguide layer; and the thickness of the waveguide layer is set so that the refractive index of the channel for a fundamental is greater than that for an SH (second harmonic) and the refractive index of portions on the both sides of the channel for the SH is greater than that for the fundamental, thereby accomplishing the phase matching between the fundamental and the SH, which satisfies the conditions that an output power of 2 mW or more which is sufficient for reading signals from an optical disk, that the optical intensity distribution at a light emitting end has a single peak, that the optical spot diameter at a light emitting end is small enough, and that the wavelength of the output is in the blue region.

19 Claims, 10 Drawing Sheets

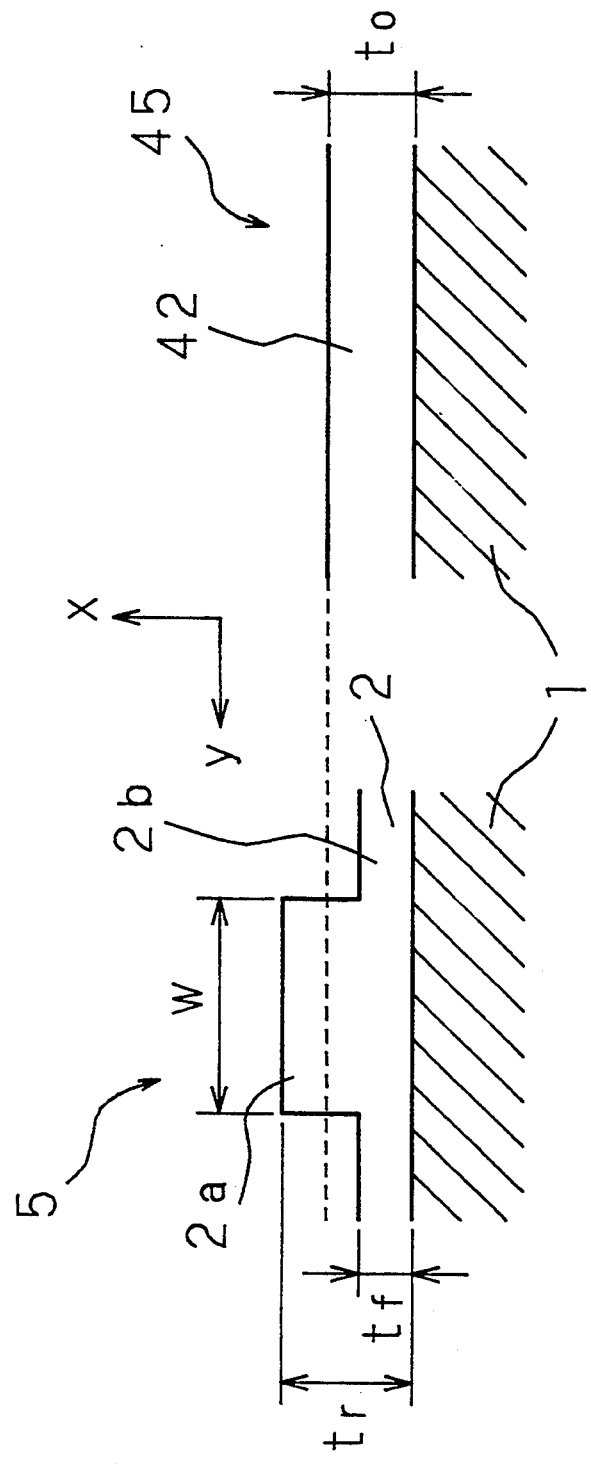

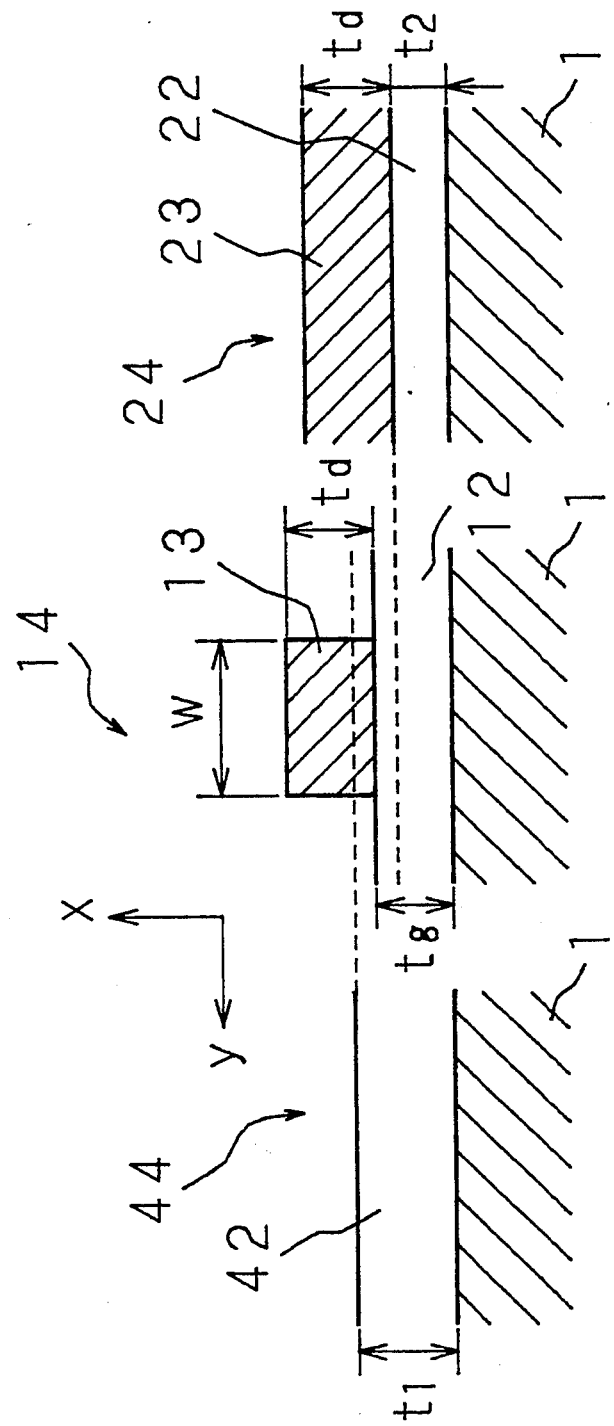

SHG (SECOND-HARMONIC GENERATION) DEVICE

BACKGROUND OF THE INVENTION

1. Field of the Invention

This invention relates to an SHG device having a waveguide structure useful as a short wavelength light source in a high recording density optical disk system for an optical information processing system.

2. Description of the Related Art

Generally, a light source for an optical disk system is required to have at least the following four properties:

1. An output power of 2 mW or more which is sufficient for reading signals from an optical disk can be obtained.
2. An optical intensity distribution at a light emitting end having a single peak.
3. A light spot diameter, at a light emitting end, is as small as possible.
4. A wavelength as short as possible.

One known means which can potentially satisfy all of these conditions is a combination of a near-infrared light source and an SHG device with a waveguide structure made of a nonlinear optical medium. The employment of a waveguide structure allows a substantially complete phase matching between a fundamental and a second harmonic (hereinafter, abbreviated as "SH") to be realized applying a modal dispersion characteristic of a waveguide and bire-fringence of the waveguide material. The fundamental is confined in a narrow space so that a relatively high conversion efficiency of the optical frequency (wavelength) can be expected.

In order to obtain a higher conversion efficiency, however, further conditions must be satisfied such as the nonlinear optical medium having a larger nonlinear optical coefficient in relation to the frequency conversion efficiency, and phase matching between modes of the same order so that a spatial overlap between the fundamental and the SH becomes large.

In order to satisfy the condition that the optical intensity distribution at a light emitting end have a single peak, the SH must be in the lowest-order mode. Furthermore, since phase matching between modes of the same order must be realized as described above, phase matching between a lowest-order mode fundamental and a lowest-order mode SH is required.

Conventionally, $LiNbO_3$ has been widely studied as a nonlinear optical medium for constituting a waveguide. However, the nonlinear optical coefficient $d_{31}$, of $LiNbO_3$, which concerns frequency conversion applying modal dispersion phase matching is small ($d_{31}=6.5$ pm/V), and therefore it is not possible to obtain a sufficiently large output. Moreover, since the obtained SH is green light having a wavelength of about 0.55 μm (Miyazaki et al.: reports for Electro-magnetic Theory Study, BMT-78-5, 1978), the material is not sufficient from the view point of wavelength.

As a means for overcoming the above deficiencies, an SHG device with a slab (planar) waveguide has been proposed (p. 1472; IBM Technical Disclosure Bulletin, Vol. 24, No. 3, August 1981). This proposed device can accomplish phase matching between a zeroth-order mode fundamental and a zeroth-order mode SH, and production of light of a sufficiently short wavelength using $KNbO_3$ which has larger nonlinear optical coefficients $d_{32}$ (=18.3 pm/V) and $d_{31}$ (=15.8 pm/V).

FIG. 1 is a schematic diagram showing the configuration of the above-mentioned conventional SHG device having a slab waveguide structure which uses a thin film of a $KNbO_3$ single crystal. In the figure, a numeral 1 designates a substrate of crystallized quartz or the like on which a slab waveguide layer 52 made of $KNbO_3$ is layered. Laser beam LD of a fundamental frequency is incident on one end face of the slab waveguide layer 52, and an SH emits from the other end face. An air layer which functions as a cladding layer exists on the waveguide layer 52.

The prior art literature does not mention the details of conditions for accomplishing phase matching. The inventors of the present invention designed and produced on an experimental basis an SHG device having a slab waveguide structure using a thin film of $KNbO_3$ as shown in FIG. 1. The outline of this experiment will be described below.

At first, the outline of the design philosophy of the inventors will be described.

FIG. 4 is a graph which shows guided mode dispersion curves in which the abscissa indicates a film thickness t and the ordinate indicates an effective index N of the slab waveguide layer. In the graph, $C_1$ indicates a zeroth-order mode dispersion curve of a fundamental, and $C_2$ a zeroth-order mode dispersion curve of an SH. The refractive index of the substrate for one wavelength is indicated by ns and that of the slab waveguide for the wavelength by nf, the waveguide mode dispersion curves $C_1$ and $C_2$ rise from the points of cutoff film thickness tc (tcw, tc2w) and effective index N (nsw, ns2w), and, as the film thickness increases. The effective indices N's gradually reach nfw and nf2w, respectively. Further, it will be seen that the shorter a wavelength is, the thinner the cutoff film thickness is.

By adequately selecting a nonlinear optical medium for the waveguide layer having the refractive index nfw of the fundamental is greater than the refractive index nf2w of an SH, and a material for the substrate having the refractive index nsw of the fundamental is smaller than the refractive index ns2w of the SH, the zeroth-order mode dispersion curve $C_1$ of the fundamental always intersects the zeroth-order mode dispersion curve $C_2$ of the SH. When the slab waveguide layer has the film thickness $t_{pm}$ corresponding to the point at which the dispersion curves $C_1$ and $C_2$ intersect, the effective index of the fundamental is equal to that of the SH, thereby achieving phase matching between the fundamental and the SH.

Most of the materials useful for a substrate satisfy the relation of nsw<ns2w. When $KNbO_3$ is used as the material of the waveguide layer, phase matching between a zeroth-order mode fundamental and a zeroth-order mode SH is accomplished in the region where the wavelength of the fundamental is longer than 0.86 μm (the wavelength of the SH is in the blue region of longer than 0.43 μm). As a result, an SHG device having a slab waveguide structure which uses $KNbO_3$ can realize phase matching between a zeroth-order mode fundamental and a zeroth-order mode SH, thereby satisfying the condition that the wavelength be sufficiently short.

FIG. 2 is a schematic diagram showing a configuration of an SHG device having a slab waveguide structure which has been manufactured on an experimental basis by the inventors. In FIG. 2, arrows a, b and c respectively indicate the crystal axes of $KNbO_3$. A numeral 1 designates a crystallized quartz substrate cut on the {11$\bar{2}$0} plane and polished as a mirror. A slab waveguide layer 42 of a single crystal of KNbO$_3$ having a thickness of 2.1 μm and a c-axis orientation (which means that the c-axis of KNbO$_3$ is oriented in the direction perpendicular to the substrate surface) is formed on the entire surface of the substrate 1 using an LPE (Liquid Phase Epitaxy) technique, to obtain an SHG device with a slab waveguide structure. In the figure, a numeral 4 designates a semiconductor laser device optically engaging one end face of the slab waveguide layer 42.

FIG. 3 is a graph showing the refractive indices of KNbO$_3$, which is a nonlinear optical medium, where the abscissa indicates the wavelength (μm) and the ordinate the refractive index. In the graph, na, nb and nc indicate principal refractive indices along the a-axis, b-axis and c-axis directions, respectively. When comparing the principal refractive index nb at the wavelength of 0.86 μm with the principal refractive index nc at the wavelength of 0.43 μm which is the half of 0.86 μm, it will be found that they are substantially equal to each other. Similarly, when comparing the principal refractive index nb at the wavelength of λ with the principal refractive index nc at the wavelength of λ/2, it will be found that the relation of nb>nc is held in the region of λ>0.86μ, that is, λ/2>0.43μ.

When setting the polarizing direction of a fundamental along the b-axis and that of an SH in the c-axis, the fundamental senses the principal refractive index nb and the SH senses the principal refractive index nc. So that in the region where the wavelength of the fundamental is longer than 0.86 μm exists the relation of nfw>nf2w between the refractive index nfw of the waveguide layer for the fundamental and the refractive index nf2w of the waveguide layer for the SH. In this case, the propagation direction of the fundamental and SH is along the a-axis, and the nonlinear optical coefficient which is concerned in the frequency conversion from the fundamental to the SH is d$_{32}$.

In FIG. 2, laser beam LD is at a fundamental frequency generated by the semiconductor laser device 4 having the oscillation wavelength, at room temperature of 0.88 μm Laser beam LD is incident on the SHG device with the slab waveguide structure so as to propagate along the a-axis direction with respect to the slab waveguide layer 42 (10 mm in the slab waveguide layer 42 in the a-axis direction) in the TE$_0$ mode (in which the electric field is parallel to the substrate).

The wavelength of the laser beam is adjusted in the vicinity of 0.88 μm by controlling the temperature of the semiconductor laser device 4 while temperature of the SHG device is constant at room temperature. The fundamental, having the wavelength of about 0.88 μm, propagate while radiately spreading in the slab waveguide layer 42. Frequency conversion occurs within the range of the propagating angle where phase matching is accomplished, and an SH is generated. The light emitted from the end face of the slab waveguide layer 42 is introduced into an infrared cut-off filter (not shown). Only light SH$_1$ of the SH is emitted, resulting in a 0.2 mW output when an output of the semiconductor laser device 4 is 95 mW. Since it is considered that the coupling efficiency of a fundamental from the semiconductor laser device 4 to the slab waveguide layer 42 is about 30%, a calculated conversion efficiency of the slab waveguide layer 42 from a fundamental to an SH is about 1%.

The SHG device described above has a slab waveguide structure in which KNbO$_3$ is used as a material for the waveguide satisfying two of the conditions required of a light source for an optical disk apparatus: the condition that the optical intensity distribution of the SH emission has a single peak; and the condition that the wavelength of an SH can be shortened to the blue region. As shown in FIG. 2, however, the SH at a light emitting end 42c (SH(e)) spreads in a long, and narrow shape. Consequently, a problem exists in that a lens system combining an ordinary collimator lens and focusing lens cannot condense the light to a minute spot, and that an output of 2 mW, as required for reproducing signals from an optical disk, cannot be obtained because of the insufficient confinement of a fundamental.

SUMMARY OF THE INVENTION

The present invention solves the deficiencies of the prior art by providing an SHG device which has a channel waveguide structure so as to satisfy four requirements including an optical intensity distribution at a light emitting end having a single peak, a sufficiently short wavelength of an SH, to produce a sufficiently small diameter spot at a light emitting end, and an output of 2 mW or more.

The above and further objects and features of the invention will more fully be apparent from the following detailed description with accompanying drawings.

BRIEF DESCRIPTION OF THE DRAWINGS

FIG. 6(a) is an enlarged sectional view of the SHG device of FIG. 5;

FIG. 6(b) is an enlarged sectional view of the SHG device of FIG. 2;

FIG. 9(a) is an enlarged sectional view of the SHG device of FIG. 2 having a three layer construction;

FIG. 9(b) is an enlarged sectional view of the SHG device of FIG. 8 having a ridged construction;

FIG. 9(c) is an enlarged sectional view of an SHG device having a four-layer construction;

DESCRIPTION OF THE PREFERRED EMBODIMENTS

An SHG device according to the invention will be described with reference to the drawings.

(Embodiment 1)

Figure 5:
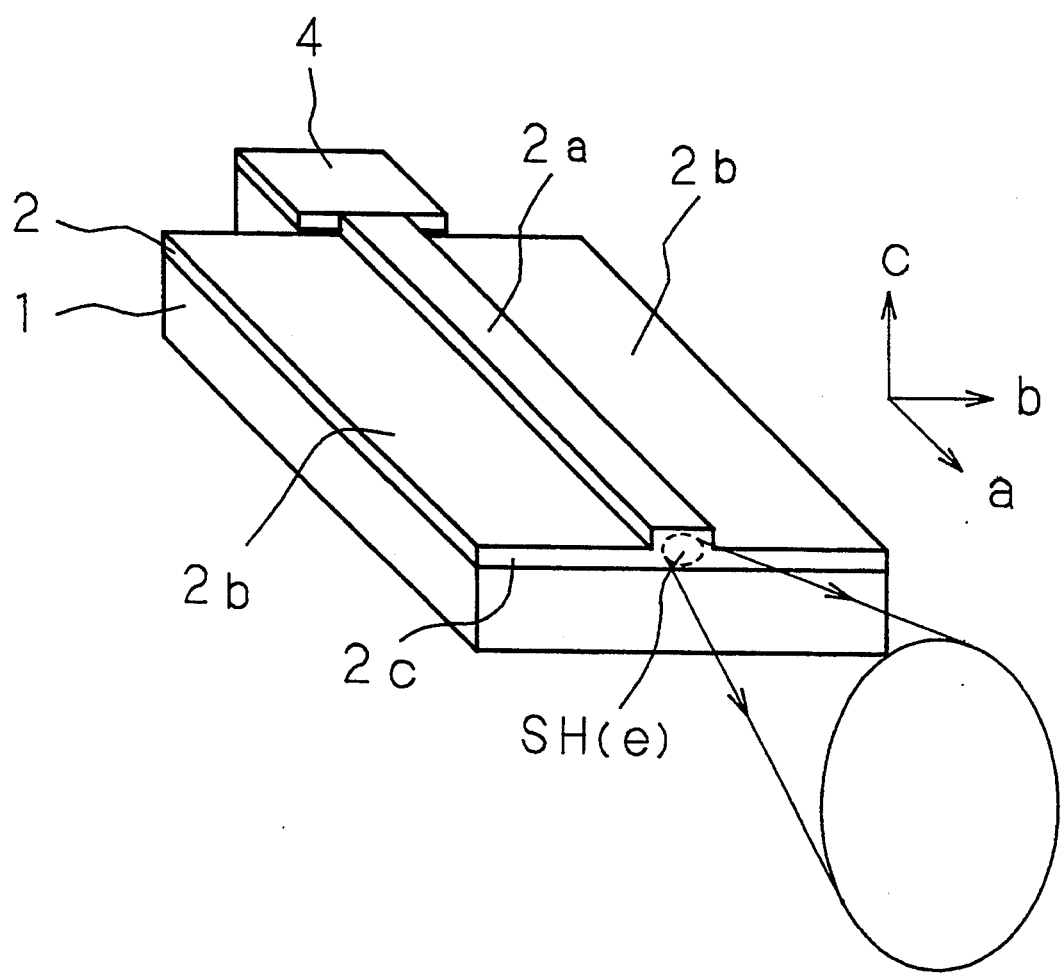
FIG. 5 is a perspective view of an embodiment of the SHG device according to the invention.

FIG. 5 is a schematic diagram of an SHG device according to the invention. In the figure, a numeral 1 designates a crystallized quartz substrate cut by the {11$\bar{2}$0} plane and the surface is polished. On the surface of the substrate 1, which is the {11$\bar{2}$0} plane, a waveguiding layer 2 made of a $KNbO_3$ single crystal is formed with a c-axis orientation in a direction perpendicular to the substrate surface. The arrows a, b and c indicate crystal axes of the $KNbO_3$ single crystal. At the center of the waveguiding layer 2 and along the whole length of the a-axis, a stripe-shaped ridged channel is formed 2a which is thicker than flat portions 2b on either side. Above the ridged channel 2a exists an air layer 5 (see FIG. 6(a)) which functions as a cladding layer. A reference numeral 4 designates a semi-conductor laser device which opposes one end face of the ridged channel 2a.

Figure 1:
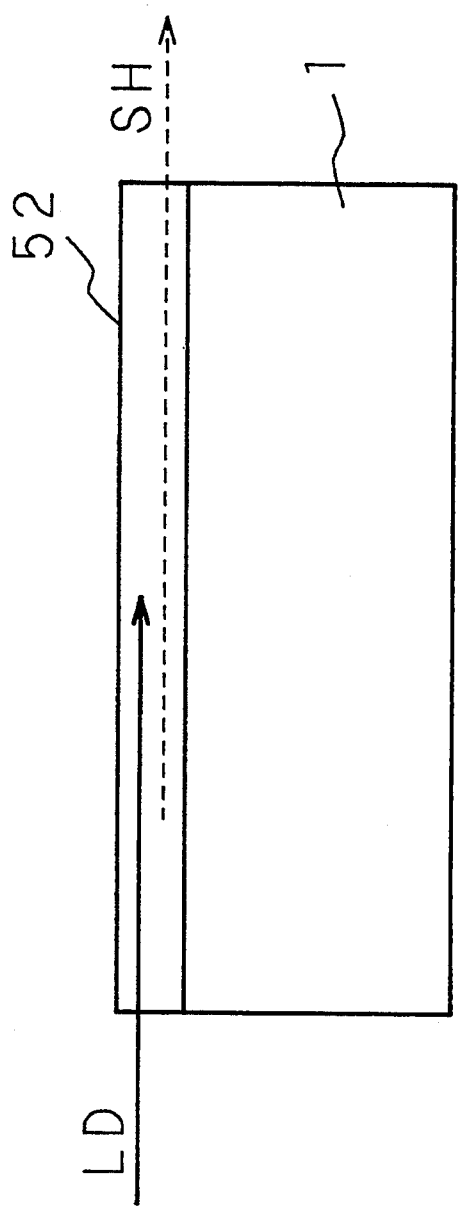
FIG. 1 is a schematic sectional view of an SHG device.
Figure 2:
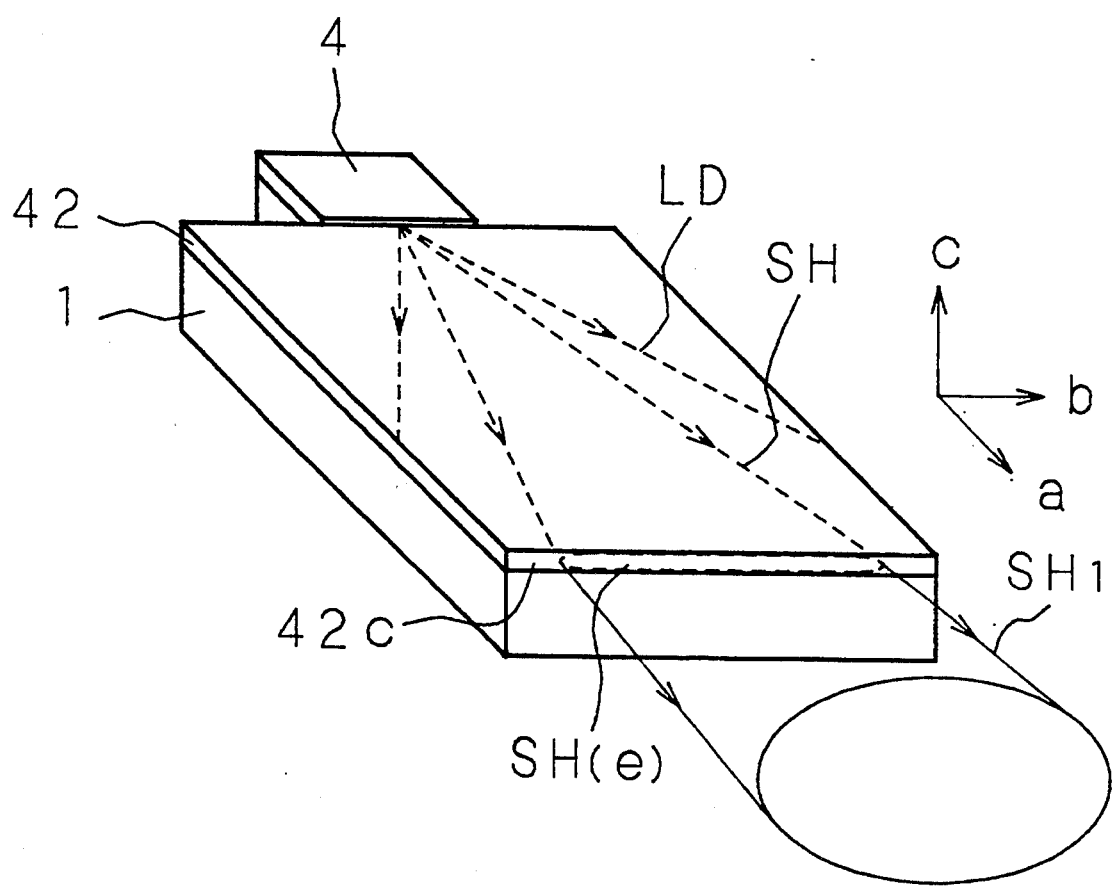
FIG. 2 is a perspective view of an SHG device having a slab waveguide structure which was designed by the inventors.
Figure 3:
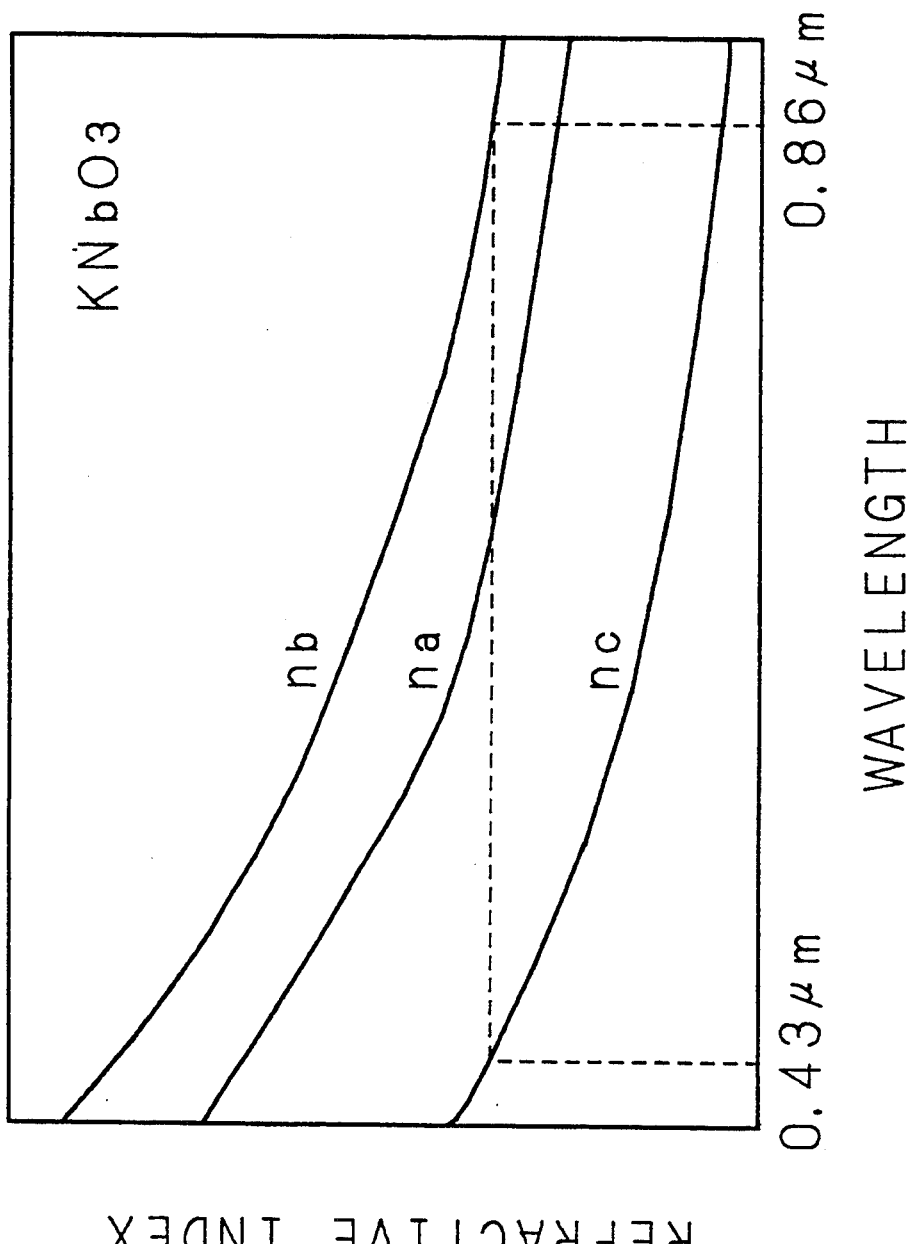
FIG. 3 is a graph showing the refractive index of KNbO$_3$.
Figure 4:
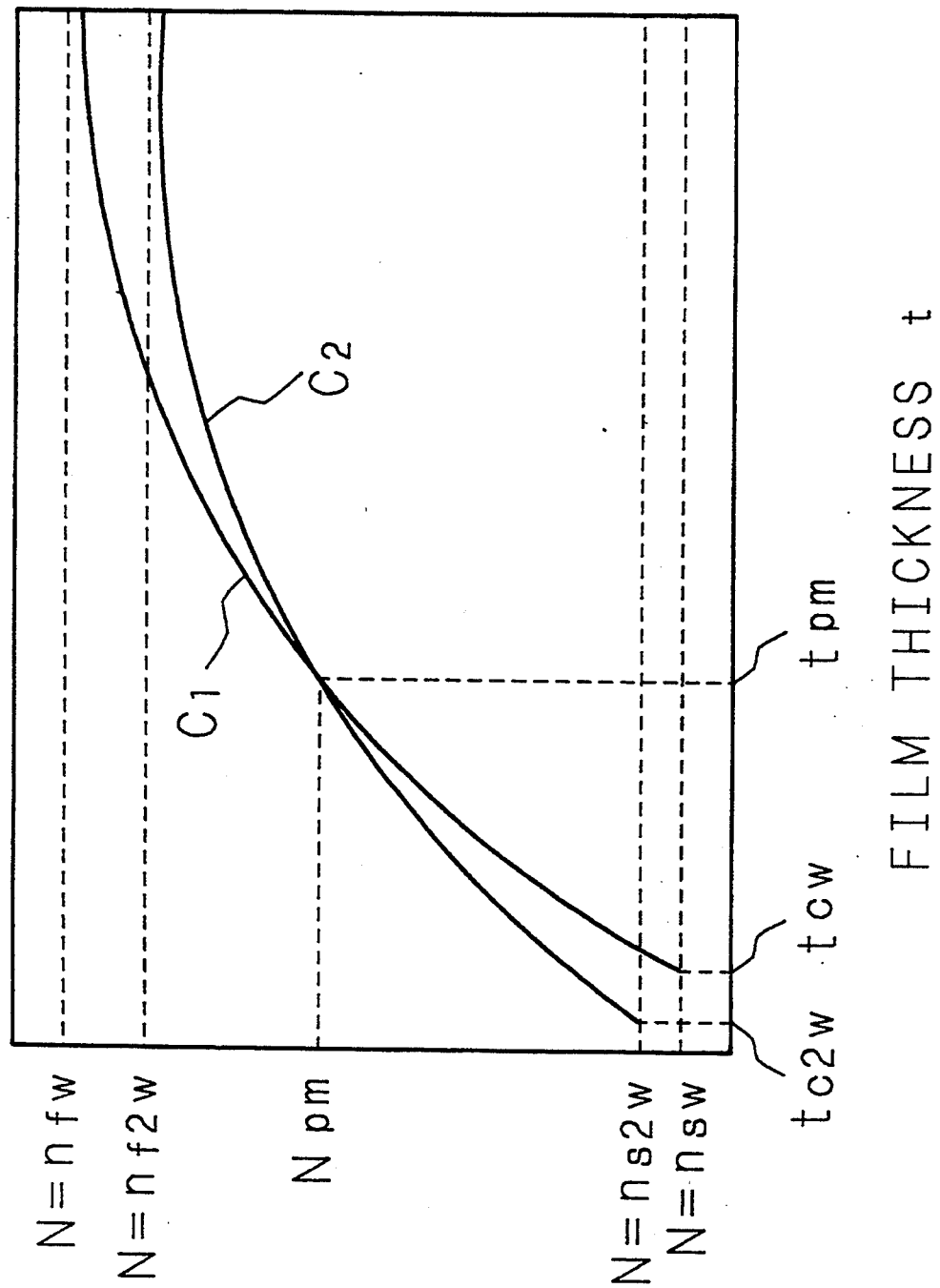
FIG. 4 is a graph showing guided mode dispersion characteristics for explaining the design philosophy of the SHG device which is shown in FIG. 2 designed by the inventors.

FIGS. 6(a) and 6(b) are enlarged sectional views showing a relationship between the waveguiding layer 2 of the SHG device of the invention shown in FIG. 5 and a slab waveguide layer 42 of an SHG device having a slab waveguide structure similar to that shown in FIG. 2. The waveguiding layer 2 of the SHG device according to the present invention, shown in FIG. 6(a), is constructed so that the thickness $t_f$ of the flat portion 2b is thinner than the thickness $t_0$ of the slab waveguide layer 42 ($t_f < t_0$), and the thickness $t_r$ of the ridged channel 2a having a width w is thicker than the thickness $t_0$ ($t_r > t_0$).

In the SHG device shown in FIG. 6(b), the slab waveguide layer 42 is layered on the substrate 1 in the same manner as the SHG device shown in FIG. 2. The materials of the substrate 1 and slab waveguide layer 42 are the same as those of the substrate 1 and waveguiding layer 2 of the device according to the invention shown in FIG. 6(a). The thickness $t_0$ of the slab waveguide layer 42 is set so that phase matching between a zeroth-order mode fundamental of a wavelength $\lambda_0$ and a zeroth-order mode SH of a wavelength $\lambda_0/2$ can be accomplished. On the waveguiding layer 2 exists an air layer 45 which functions as a cladding layer.

Figure 7A:
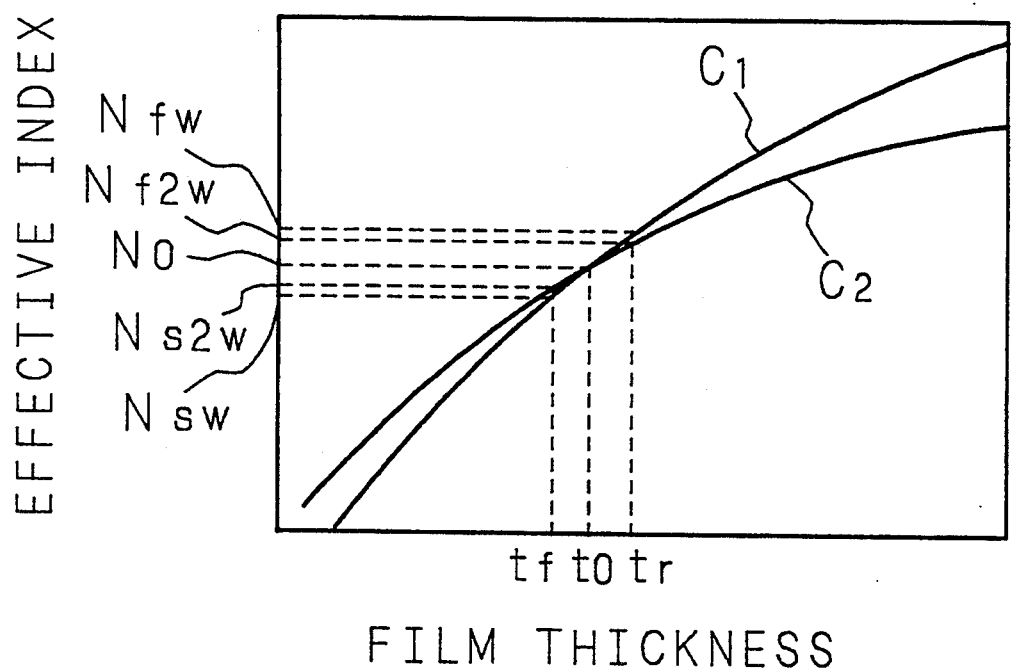
FIG. 7(a) is a graph showing the effective index of a waveguide as a function of film thickness.
Figure 7B:
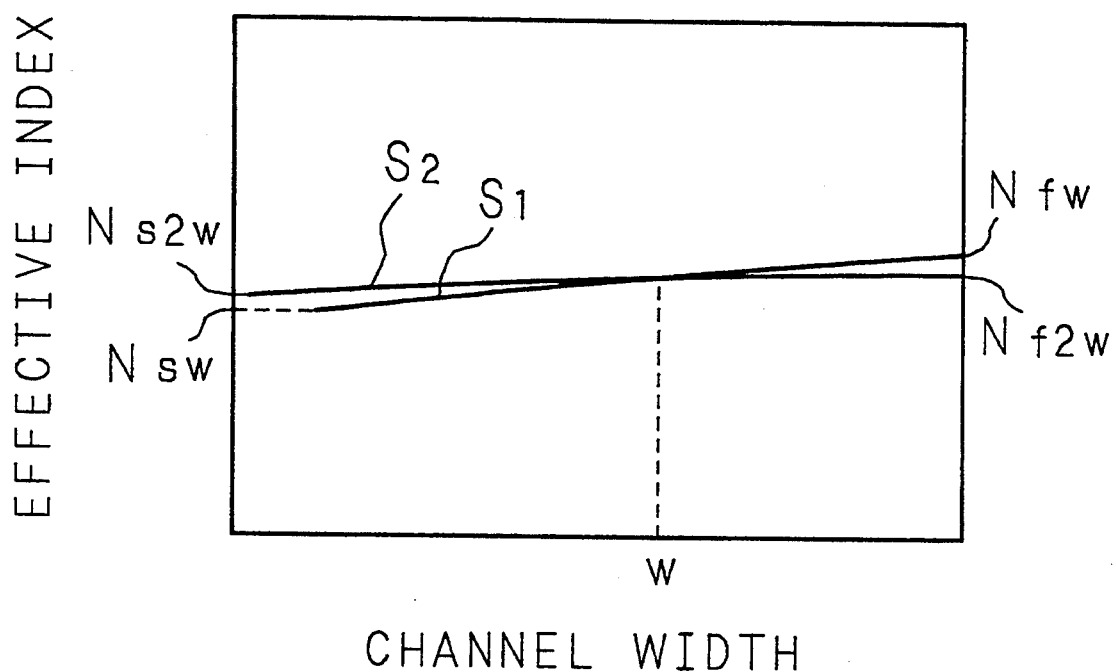
FIG. 7(b) is a graph showing the effective index of a waveguide as a function of channel width.

FIG. 7(a) is a graph showing the relationship between the film thickness and the effective index, and FIG. 7(b) is a graph showing the relationship between the channel width and the effective index. In FIG. 7(a), the abscissa indicates the film thickness and the ordinate the effective index, and, in FIG. 7(b), the abscissa indicates the channel width and the ordinate the effective index. In FIG. 7(a), $C_1$ and $C_2$ respectively indicate a dispersion curve of a $TE_0$ mode fundamental (a dispersion curve of a $TM_0$ mode fundamental) and a dispersion curve of a $TM_0$ mode SH (a dispersion curve of a $TE_0$ mode SH), and $S_1$ indicates a dispersion curve of an $E_{00}{}^y$ mode fundamental (a dispersion curve of an $E_{00}{}^x$ mode fundamental) and $S_2$ a dispersion curve of an $E_{00}{}^x$ mode SH (a dispersion curve of an $E_{00}{}^y$ mode SH). The terms in the parenthesis are for the case where the mode is set so that the b-axis of a nonlinear optical medium is oriented along the direction perpendicular to the substrate surface and the beam propagation direction is along the a-axis.

As is apparent from FIG. 7(a), phase matching between a zeroth-order mode fundamental and a zeroth-order mode SH is accomplished at the film thickness of $t_0$, where both the fundamental and SH sense the effective index of $N_0$ in the slab waveguide layer 42. The waveguiding layer 2 has refractive indexes which are determined assuming slab waveguide layers having layer thicknesses equal to the respective film thicknesses of the ridged channel 2a and flat portion 2b. The guided mode of the channel waveguide is determined by the effective index distribution along the channel width direction (y direction).

When the ridged channel 2a has a thickness of $t_r$ thicker than $t_0$ and the flat portions 2b on the both sides of the channel 2a have a thickness $t_f$ thinner than $t_0$ as shown in FIG. 6(a), it will be seen from FIG. 7(a) that the effective index of the ridged channel 2a of the thickness $t_r$ is Nfw for a fundamental and Nf2w for an SH, and the relation of Nfw>Nf2w is held. Similarly, the effective index of the flat portion 2b of the thickness $t_f$ is Nsw for a fundamental and Ns2w for an SH, and the relation of Nsw<Ns2w is held.

As shown in FIG. 7(b), therefore, the guided mode dispersion curves $S_1$ and $S_2$ with respect to the channel width always intersect at a certain channel width w along the channel width direction (y direction), and phase matching is accomplished.

In accordance with the above-discussed theory, a crystalline film of a $KNbO_3$ single crystal with the c-axis orientation and having a thickness of 2.30 μm formed on the substrate 1, and a photoresist of a width of 4.0 μm was patterned using a lithographic technique such as the electron beam writing method substantially at a center portion where the ridged channel 2a is formed. Thereafter, using the photoresist as a mask, etching a depth of about 0.30 μm is performed by an RIE (Reactive Ion Etching) method to form the ridged channel 2a (length: 10 mm, width w: 4.02 μm, thickness $t_r$: 2.30 μm), thereby producing an SHG device.

Because the thickness required for phase matching in the slab waveguide layer 42 of FIG. 6(b) is approximately 2.11 μm when a fundamental having a wavelength of 0.88 μm is applied, the thickness $t_r$ of the ridged channel 2a was set to 2.30 μm. The width w of the ridged channel 2a is set to 4.0 μm since the film thickness of the flat portion 2b is 2.0 μm and a channel width required for phase matching is calculated to be 4.02 μm.

At one end face of the ridged channel 2a of the thus configured device of the invention, a laser beam, having an oscillation wavelength of about 0.88 μm at room temperature as a fundamental frequency, is applied so that the $E_{00}{}^x$ mode was excited. The wave length of the laser beam is then finely adjusted by controlling the temperature of a semiconductor laser. As a result, when the output power of the laser beam at a fundamental frequency is 100 mW, coherent light of an SH has an output power of 2.1 mW at a wavelength of about 0.44 μm.

The spot diameter of the SH frequency (SH(e)) at the light emitting end 2c is 2.1 μm×5.6 μm at $1/e^2$ width. It is observed that a light beam from a spot with such a diameter can be focused to a light spot of 0.7 μm×1.1 μm by a focusing lens having a numerical aperture (NA) of 0.5 generally used in an optical disk pickup.

(Embodiment 2)

Figure 8:
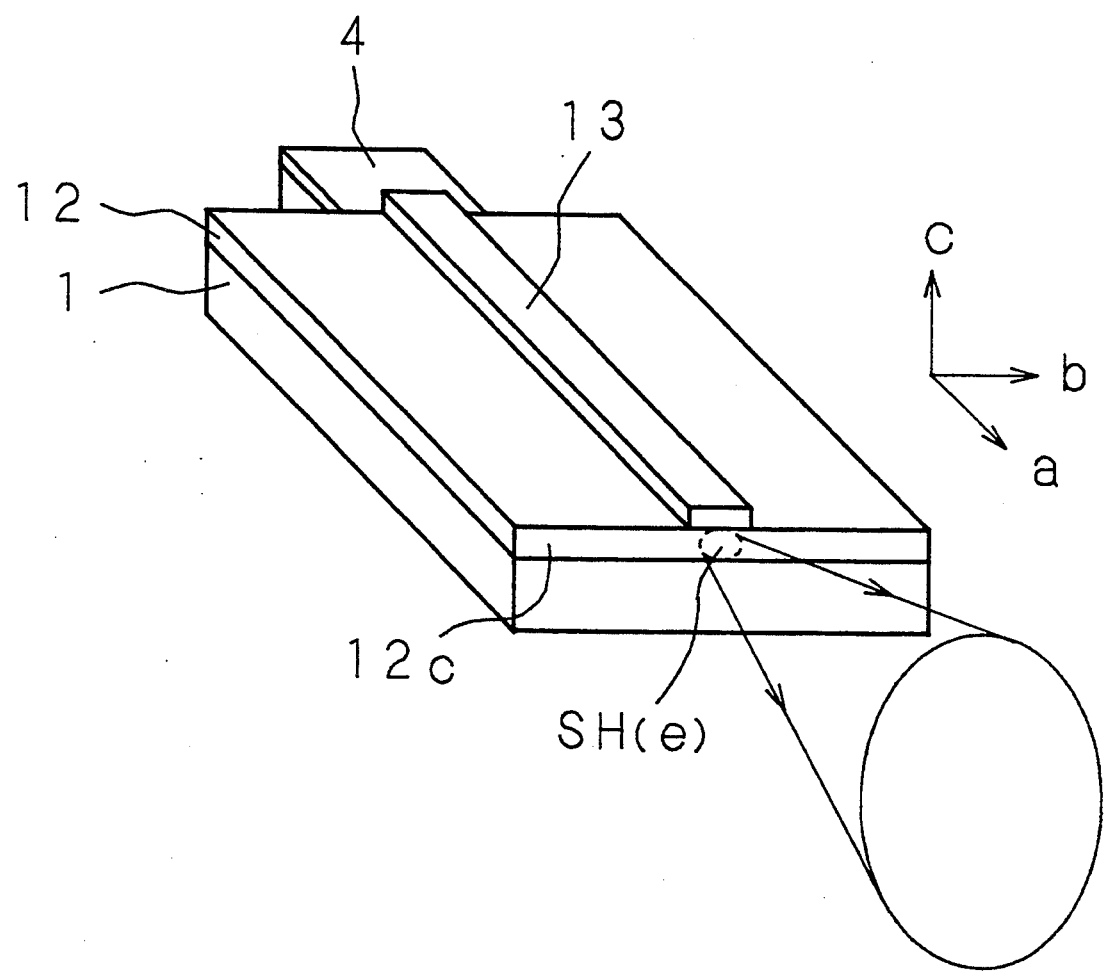
FIG. 8 is a perspective view of another embodiment of the SHG device according to the invention.

FIG. 8 is a diagram showing another embodiment of the invention. In the figure, a numeral 1 designates a crystallized quartz substrate cut on the {11$\bar{2}$0} plane with a surface which is polished. On the surface of the substrate 1 which is the {11$\bar{2}$0} plane, a slab waveguide layer 12 is formed of a $KNbO_3$ single crystal having a thickness of 2.10 μm and a c-axis thereof oriented in perpendicular to the substrate surface. The arrows a, b and c indicate crystal axes of KNbO$_3$ single crystal. On the center portion along the width direction of the slab waveguide layer 12, and along a whole length (10 mm) of the a-axis, a strip 13 having a thickness of 1.0 μm is formed of Si$_3$N$_4$ which has a smaller refractive index than the slab waveguide layer 12. The strip 13 forms a channel in the slab waveguide layer 12. A combination of this structure and an air layer 14 (shown in FIG. 9(b)) which functions as a second cladding layer positioned on the strip 13 constitutes an SHG device having a strip-loaded waveguide structure.

FIGS. 9(a) through 9(c) are partial enlarged sectional views of SHG devices. The thickness $t_g$ of the slab waveguide layer 12 of the device according to the invention shown in FIG. 9(b) is set to be thinner than the thickness $t_1$ of the slab waveguide layer 42 of the SHG device of FIG. 9(a) (same as the SHG device of FIG. 2), while thicker than the thickness $t_2$ of a slab waveguide layer 22 of an SHG device having a four-layered slab waveguide structure shown in FIG. 9(c). Thus, the following expression is held:

$$t_1 > t_g > t_2$$

The substrate 1 and slab waveguide layer 42 of the SHG device of FIG. 9(a) are respectively made of the same materials as the substrate 1 and slab waveguide layer 12 of the SHG device of the present invention which has the channel waveguide structure shown in FIG. 9(b). The thickness $t_1$ of the slab waveguide layer 42 is set so that phase matching between a zeroth-order mode fundamental of a wavelength $\lambda_0$ and a zeroth-order mode SH of a wavelength $\lambda_0/2$ is accomplished. On the slab waveguide layer 42 exists an air layer 44 which functions as a cladding layer.

On the other hand, the SHG device shown in FIG. 9(c) has the four-layered slab waveguide structure which has a slab waveguide layer 22 and first cladding layer 23 layered on the substrate 1 in this sequence and includes an air layer 24 on the first cladding layer 23 functioning as a second cladding layer. The materials of the substrate 1, slab waveguide layer 22 and first cladding layer 23 of the SHG device shown in FIG. 9(c) are respectively the same as those of the substrate 1, slab waveguide layer 12 and strip 13 of the SHG device shown in FIG. 9(b). The thickness $t_2$ of the slab waveguide layer 22 is set so that phase matching between a zeroth-order mode fundamental of a wavelength $\lambda_0$ and a zeroth-order mode SH of a wavelength $\lambda_0/2$ is accomplished.

Figure 10A:
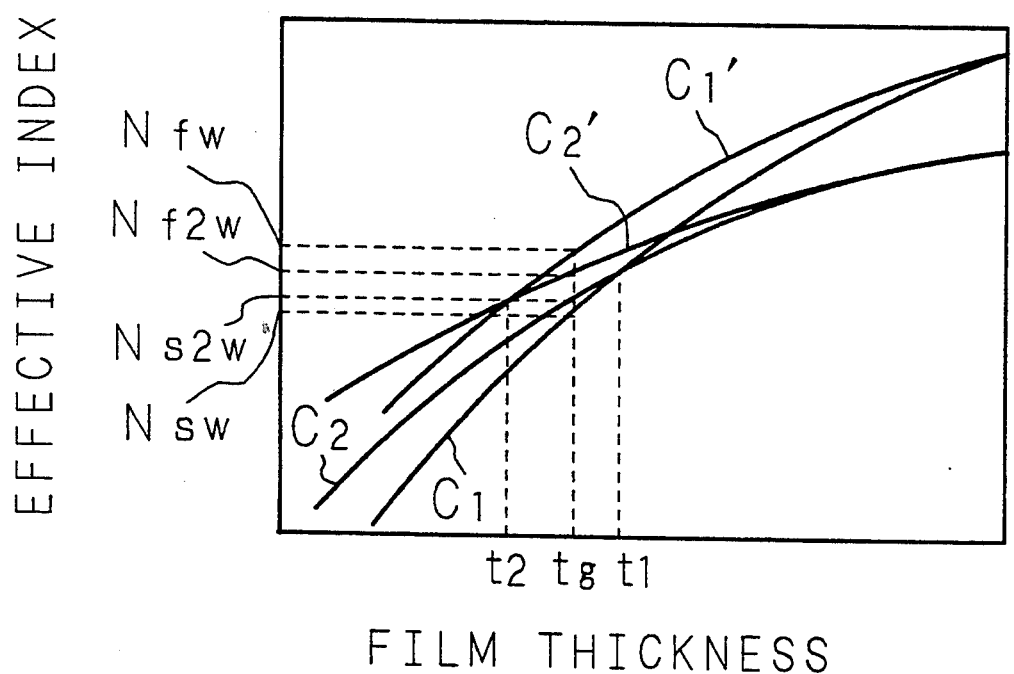
FIG. 10(a) is a graph showing the effective index of the waveguide of FIG. 8 as a function of film thickness.

FIG. 10(a) is a graph showing the relationship between the film thickness and the effective index for a fundamental and an SH in the SHG device having a three-layered slab waveguide structure as shown in FIG. 9(a) in which an air layer functions as a cladding layer, and also the relationship between the film thickness and the effective index for a fundamental and an SH in the SHG device having a four-layered slab waveguide structure such as shown in FIG. 9(c) having a cladding layer with a thickness $t_d$ and an effective index smaller than that of the material of the waveguide. In the graph, C$_1$ and C$_2$ respectively indicate dispersion curves of a fundamental and an SH in the above-mentioned SHG device having the three-layered slab waveguide structure, and C$_1'$ and C$_2'$ dispersion curves of a fundamental and an SH in the above-mentioned SHG device having the four-layered slab waveguide structure. In the three-layered slab waveguide structure phase matching is accomplished at the film thickness $t_1$, while in the four-layered slab waveguide structure phase matching is accomplished at the film thickness $t_2$.

In the loaded channel waveguide which is used in the SHG device according to the invention as shown in FIG. 9(b), it can be considered that the portion where the strip 13 is loaded corresponds to the four-layered slab waveguide structure shown in FIG. 9(c) and the other portion corresponds to the three-layered slab waveguide structure shown in FIG. 9(a). Therefore, the dispersion characteristics along the channel width direction (y direction) can be analyzed in a similar manner as that of Embodiment 1.

By fixing the thickness $t_g$ of the slab waveguide layer 12 at a value between the thicknesses $t_1$ and $t_2$ as shown in FIG. 9(b), the relation of Nfw>Nf2w to be held as shown in FIG. 10(a) between the refractive indices Nfw and Nf2w of the strip 13 for a fundamental and SH. Also, between the refractive indices Nsw and Ns2w of the three-layered portions on the both sides of the strip 13 for a fundamental and SH, the relation of Nsw<Ns2w is held.

Figure 10B:
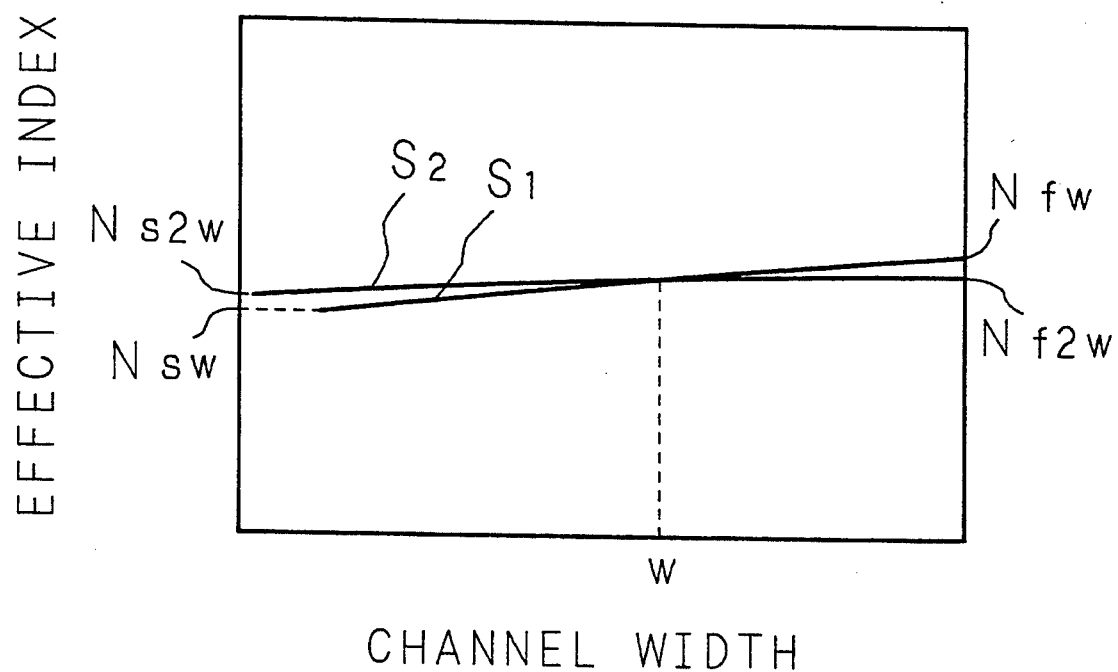
FIG. 10(b) is a graph showing the effective index of a waveguide of FIG. 8 as a function of channel width.

As shown in FIG. 10(b), therefore, the guided mode dispersion curves S$_1$ and S$_2$, taken as a function of the channel width equaling the width of the strip 13, always intersect at a certain channel width w (y direction) thereby producing phase matching.

In accordance with the above-discussed theory, the slab waveguide layer 12 made of a KNbO$_3$ single crystal with the c-axis orientation and a thickness of 2.10 μm is formed on the crystallized quartz substrate 1 cut on the {11$\bar{2}$0} plane where the cut surface is polished as a mirror. a photoresist having a window of 4.7 μm wide for forming the strip was patterned along the entire length of the a-axis of the slab waveguide layer 12 using a lithographic technique such as electron beam writing. After Si$_3$N$_4$ is deposited in a thickness of 1.0 μm by the plasma CVD method, the photoresist and Si$_3$N$_4$ not in the channel portion is removed by a lift off method to form the strip 13 of 10 mm length, thereby producing the SHG device as shown in FIG. 8.

The thickness $t_g$ of the slab waveguide layer 12 is set to 2.10 μm based on the following. In the case where a fundamental frequency having a wavelength of 0.88 μm, phase matching is accomplished in the SHG device of FIG. 9(a) when the thickness $t_1$ of the slab waveguide layer 42 of KNbO$_3$ single crystal is calculated to be 2.11 μm, where the three-layered slab waveguide structure is used. In the SHG device of FIG. 9(c), having the four-layered slab waveguide structure where the first cladding layer 23 is Si$_3$N$_4$ and the second cladding layer is the air layer 24, phase matching is accomplished when the thickness $t_2$ of the slab waveguide layer 22 of KNbO$_3$ single crystal is calculated to be 2.03 μm.

The width w of the strip 13 was set to 4.7 μm because, when the film thickness $t_g$ of the slab waveguide layer 12 is 2.10 μm and the film thickness $t_d$ of the first cladding layer 13 is 1.0 μm, a channel width required for accomplishing phase matching is calculated to be 4.71 μm.

When the slab waveguide layer 12 of the above-described SHG device on which the strip 13 is formed, has a fundamental frequency laser beam from the semiconductor laser device 4 applied to it, a laser beam of an SH with an output power of about 2.7 mW and a wavelength of about 0.44 μm is obtained.

The spot diameter of the SH (SH(e)) at the light emitting end 12c is 1.9 μm×9.8 μm at the $1/e^2$ width. It is observed that the light beam from a spot having such a diameter can be focused to a spot of 0.7 μm×1.9 μm by an optical system which is similar to that employed in Embodiment 1.

Although in Embodiments 1 and 2, crystallized quartz cut on the $\{11\bar{2}0\}$ plane was used as a substrate, the same effects can be attained by using sapphire (Al$_2$O$_3$) cut on the $\{11\bar{2}0\}$ plane, KTP (KTiOPO$_4$) cut on the $\{100\}$ plane, MgO.Al$_2$O$_3$ (spinel) cut on the $\{100\}$ plane, MgO cut on the $\{100\}$ plane, etc.

The material of the substrate used in Embodiment 1, 2 may be a single crystal which has a refractive index smaller than that of the material of the waveguide layer, and a lattice spacing in the cut plane approximately the same as a lattice constant of the material of the waveguide layer, thereby achieving good lattice matching between the substrate and waveguide layer.

An alternative embodiment having a crystalline thin film of a KNbO$_3$ single crystal with the b-axis oriented perpendicular to the substrate surface and a light propagation direction along the a-axis may be formed on an adequate substrate. A fundamental and an SH then propagate in the $E_{00}^x$ mode and the $E_{00}^y$ mode, respectively.

Although, in Embodiment 2, Si$_3$N$_4$ was used as the material of the strip of the SHG device having a strip-loaded waveguide structure, the material of the strip is not restricted to this, but any material which has a refractive index smaller than that of the material of the waveguide may be used.

While in Embodiments 1 and 2 the wavelength of the fundamental is 0.88 μm, the effects of the invention can be attained at any wavelength longer than 0.86 μm.

As this invention may be embodied in several forms without departing from the scope and spirit of the invention, the embodiments presented are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. An SHG device for generating a second harmonic wave by applying nonlinear optics to a fundamental wave of a coherent light having a fundamental wavelength comprising:
   a substrate;
   a waveguide layer, which is optically nonlinear, formed of a KNbO$_3$ single crystal on said substrate;
   said substrate having a refractive index smaller than a refractive index of said waveguide layer and a lattice spacing substantially equivalent to that of said waveguide layer;
   a cladding layer on said waveguide layer;
   said waveguide layer having a ridged channel and flat portions adjoining opposing sides of said ridged channel;
   said flat portions having a thickness $t_f$;
   said ridged channel having a thickness $t_r$ thicker than said thickness $t_f$;
   said thickness $t_f$ being selected such that an effective refractive index at said fundamental wavelength is less than an effective refractive index at said second harmonic wavelength as determined by a three-layer slab waveguide characteristic applied to said flat portions;
   said thickness $t_r$ being selected such that an effective refractive index at said fundamental wavelength is greater than an effective refractive index at said second harmonic wavelength as determined by a three-layer slab waveguide characteristic applied to said ridged channel; and
   said waveguide layer having a c-axis oriented perpendicular to a contacting surface of said substrate and an a-axis oriented parallel to said ridged channel such that guided mode phase matching is achieved wherein a zeroth-order mode of said second harmonic wave is phase matched to a zeroth-order mode of said fundamental wave.

2. An SHG device according to claim 1, wherein said fundamental wavelength of said coherent light is longer than 0.86 μm.

3. An SHG device according to claim 1, wherein said substrate is $\{11\bar{2}0\}$-cut sapphire (Al$_2$O$_3$).

4. An SHG device according to claim 1, wherein said substrate is $\{100\}$-cut KTP (KTiOPO$_4$).

5. An SHG device according to claim 1, wherein said substrate is $\{11\bar{2}0\}$-cut crystallized quartz.

6. An SHG device according to claim 1, wherein said substrate is $\{100\}$-cut MgO.Al$_2$O$_3$ (spinel).

7. An SHG device according to claim 1, wherein said substrate is $\{100\}$-cut MgO.

8. An SHG device for generating a second harmonic wave by applying nonlinear optics to a fundamental wave of a coherent light having a fundamental wavelength comprising:
   a substrate;
   a waveguide layer, which is optically nonlinear, formed of a KNbO$_3$ single crystal on said substrate;
   said waveguide layer having a thickness $t_g$;
   said substrate having a refractive index smaller than a refractive index of said waveguide layer and a lattice spacing substantially equivalent to that of said waveguide layer;
   a ridge portion of said waveguide layer having a ridge formed of a strip of a material with a refractive index smaller than said refractive index of said waveguide layer loaded on a part of said waveguide layer;
   flat portions of said waveguide layer adjoining opposing sides of said ridge portion;
   a cladding layer on said ridge portion and said flat portions;
   said thickness $t_g$ being less than a phase matching thickness as determined by a three-layer slab waveguide characteristic applied to said flat portions;
   said thickness $t_g$ being greater than a phase matching thickness as determined by a four-layer slab waveguide characteristic applied to said ridge portion; and
   said waveguide layer having a c-axis oriented perpendicular to a contacting surface of said substrate and an a-axis oriented parallel to said ridge portion such that guided mode phase matching is achieved wherein a zeroth-order mode of said second harmonic wave is phase matched to a zeroth-order mode of said fundamental wave.

9. An SHG device according to claim 8, wherein said strip is made of Si$_3$N$_4$.

10. An SHG device according to claim 8, wherein said fundamental wavelength of said coherent light is longer than 0.86 μm.

11. An SHG device according to claim 8, wherein said substrate is {11$\bar{2}$0}-cut sapphire ($Al_2O_3$).

12. An SHG device according to claim 8, wherein said substrate is {100}-cut KTP ($KTiOPO_4$).

13. An SHG device according to claim 8, wherein said substrate is {11$\bar{2}$0}-cut crystallized quartz.

14. An SHG device according to claim 8, wherein said substrate is {100}-cut $MgO \cdot Al_2O_3$ (spinel).

15. An SHG device according to claim 8, wherein said substrate is {100}-cut MgO.

16. An SHG device for generating a second harmonic wave by applying nonlinear optics to a fundamental wave of a coherent light having a fundamental wavelength comprising:

a substrate;

a waveguide layer, which is optically nonlinear, formed of a $KNbO_3$ single crystal on said substrate;

said substrate having a refractive index smaller than a refractive index of said waveguide layer and a lattice spacing substantially equivalent to that of said waveguide layer;

a cladding layer on said waveguide layer;

said waveguide layer having a ridged channel and flat portions adjoining opposing sides of said ridged channel;

said flat portions having a thickness $t_f$;

said ridged channel having a thickness $t_r$ thicker than said thickness $t_f$;

said thickness $t_f$ being selected such that an effective refractive index at said fundamental wavelength is less than an effective refractive index at said second harmonic wavelength as determined by a three-layer slab waveguide characteristic applied to said flat portions;

said thickness $t_r$ being selected such that an effective refractive index at said fundamental wavelength is greater than an effective refractive index at said second harmonic wavelength as determined by a three-layer slab waveguide characteristic applied to said ridged channel; and said waveguide layer having a b-axis oriented perpendicular to a contacting surface of said substrate and an a-axis oriented parallel to said ridged channel such that guided mode phase matching is achieved wherein a zeroth-order mode of said second harmonic wave is phase matched to a zeroth-order mode of said fundamental wave.

17. An SHG device according to claim 16, wherein said fundamental wavelength of said coherent light is longer than 0.86 μm.

18. An SHG device for generating a second harmonic wave by applying nonlinear optics to a fundamental wave of a coherent light having a fundamental wavelength comprising:

a substrate;

a waveguide layer, which is optically nonlinear, formed of a $KNbO_3$ single crystal on said substrate;

said waveguide layer having a thickness $t_g$;

said substrate having a refractive index smaller than a refractive index of said waveguide layer and a lattice spacing substantially equivalent to that of said waveguide layer;

a ridge portion of said waveguide layer having a ridge formed of a strip of material with a refractive index smaller than said refractive index of said waveguide layer loaded on a part of said waveguide layer;

flat portions of said waveguide layer adjoining opposing sides of said ridge portion;

a cladding layer on said ridge portion and said flat portions;

said thickness $t_g$ being less than a phase matching thickness as determined by a three-layer slab waveguide characteristic applied to said flat portions;

said thickness $t_g$ being greater than a phase matching thickness as determined by a four-layer slab waveguide characteristic applied to said ridge portion; and said waveguide layer having a b-axis oriented perpendicular to a contacting surface of said substrate and an a-axis oriented parallel to said ridge portion such that guided mode phase matching is achieved wherein a zeroth-order mode of said second harmonic wave is phase matched to a zeroth-order mode of said fundamental wave.

19. An SHG device according to claim 18, wherein said fundamental wavelength of said coherent light is longer than 0.86 μm.

* * * * *